US012520048B2

(12) United States Patent
Oreifej et al.

(10) Patent No.: US 12,520,048 B2
(45) Date of Patent: Jan. 6, 2026

(54) SYSTEM TO COLLECT TRAINING DATA FOR IMAGING UNDER DISPLAY

(71) Applicant: Synaptics Incorporated, San Jose, CA (US)

(72) Inventors: Omar Oreifej, Los Angeles, CA (US); Karthikeyan Shanmuga Vadivel, San Jose, CA (US); Patrick A. Worfolk, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 124 days.

(21) Appl. No.: 18/325,420

(22) Filed: May 30, 2023

(65) Prior Publication Data

US 2024/0406580 A1    Dec. 5, 2024

(51) Int. Cl.
*H04N 23/81* (2023.01)
*G06T 5/50* (2006.01)
*H04N 23/53* (2023.01)
*H04N 23/695* (2023.01)

(52) U.S. Cl.
CPC ............... *H04N 23/81* (2023.01); *G06T 5/50* (2013.01); *H04N 23/531* (2023.01); *H04N 23/695* (2023.01); *G06T 2207/20081* (2013.01); *G06T 2207/20084* (2013.01)

(58) Field of Classification Search
CPC .... H04N 23/81; H04N 23/531; H04N 23/695; H04N 23/64; H04N 23/74; G06T 5/50; G06T 2207/20081; G06T 2207/20084
See application file for complete search history.

(56) References Cited

U.S. PATENT DOCUMENTS

| | | | | |
|---|---|---|---|---|
| 11,368,617 | B2* | 6/2022 | Zhou | G06V 10/764 |
| 11,722,796 | B2* | 8/2023 | Vyas | H04N 23/51 |
| 2022/0398698 | A1* | 12/2022 | Li | G06N 3/09 |
| 2024/0135673 | A1* | 4/2024 | Xu | G06T 5/60 |
| 2024/0414446 | A1* | 12/2024 | Tsukamoto | H04N 23/71 |

OTHER PUBLICATIONS

Zhou, Yuqian, et al. "Image restoration for under-display camera." Proceedings of the ieee/cvf conference on computer vision and pattern recognition. 2021. (Year: 2021).*
Ahn, Kyusu, et al. "UDC-SIT: a real-world dataset for under-display cameras." Advances in Neural Information Processing Systems 36 (2023): 67721-67740. (Year: 2023).*

* cited by examiner

*Primary Examiner* — Shahbaz Nazrul
(74) *Attorney, Agent, or Firm* — Paradice & Li LLP

(57) ABSTRACT

This disclosure provides methods, devices, and systems for machine learning. The present implementations more specifically relate to automatons that can acquire input images and ground truth images for training neural network models. In some aspects, a system for acquiring training data may include a camera, an electronic display, and an apparatus configured to maintain the camera in a stationary position while moving the electronic display in and out of the camera's field-of-view (FOV). In some aspects, the system may further include a controller configured to acquire training data via the camera based on the positioning of the electronic display. In some implementations, the controller may acquire ground truth images of a scene while the electronic display is covering the camera's FOV. In some other implementations, the controller may acquire input images of the scene while the electronic display is outside the camera's FOV.

20 Claims, 6 Drawing Sheets

SYSTEM TO COLLECT TRAINING DATA FOR IMAGING UNDER DISPLAY

TECHNICAL FIELD

The present implementations relate generally to machine learning, and specifically to a system to collect training data for imaging under display.

BACKGROUND OF RELATED ART

Many devices with electronic displays, such as smartphones, tablets, and laptop computers, include a front-facing camera that is coplanar with the display. The front-facing camera allows users to capture images of themselves (also referred to as "selfies") while the electronic display allows the users to preview the images in real time. As such, the front-facing camera is often colloquially referred to as a "selfie camera." The front-facing camera is often disposed in a region of the device that provides an unobstructed view of the environment. Thus, when integrated on the same surface or plane as the electronic display, the front-facing camera is often disposed within a notch or cutout of the display (or adjacent to the display). Such placement of the front-facing camera results in large and unsightly borders or other unusable portions on the electronic display, which may detract from the aesthetics of the device and limit the device's screen-to-body ratio.

Advancements in image capture and display technologies have created opportunities to expand the usable portion of the electronic display, without eliminating the front-facing camera, through greater integration of the camera and the display. In some configurations, the increase in usable display area may be achieved at the expense of greater noise or interference in images captured by the front-facing camera. Thus, as image capture and display technologies continue to evolve, new image processing techniques may be needed to support further increases in usable display area.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a system including a camera and an electronic display. The system further includes an apparatus configured to move the electronic display between a first position and a second position so that the electronic display covers a field-of-view (FOV) of the camera in the first position and is outside the FOV of the camera in the second position. Still further, the system includes a controller configured to acquire a plurality of images of a scene via the camera based on the positioning of the electronic display relative to the camera.

Another innovative aspect of the subject matter of this disclosure can be implemented in a machine learning system including a processing system and a memory. The memory stores instructions that, when executed by the processing system, causes the machine learning system to move an electronic display between a first position and a second position relative to a camera so that the electronic display covers an FOV of the camera in the first position and is outside the FOV of the camera in the second position; and acquire a plurality of images of a scene via the camera based on the positioning of the electronic display relative to the camera.

BRIEF DESCRIPTION OF THE DRAWINGS

The present embodiments are illustrated by way of example and are not intended to be limited by the figures of the accompanying drawings.

DETAILED DESCRIPTION

Figure 1:
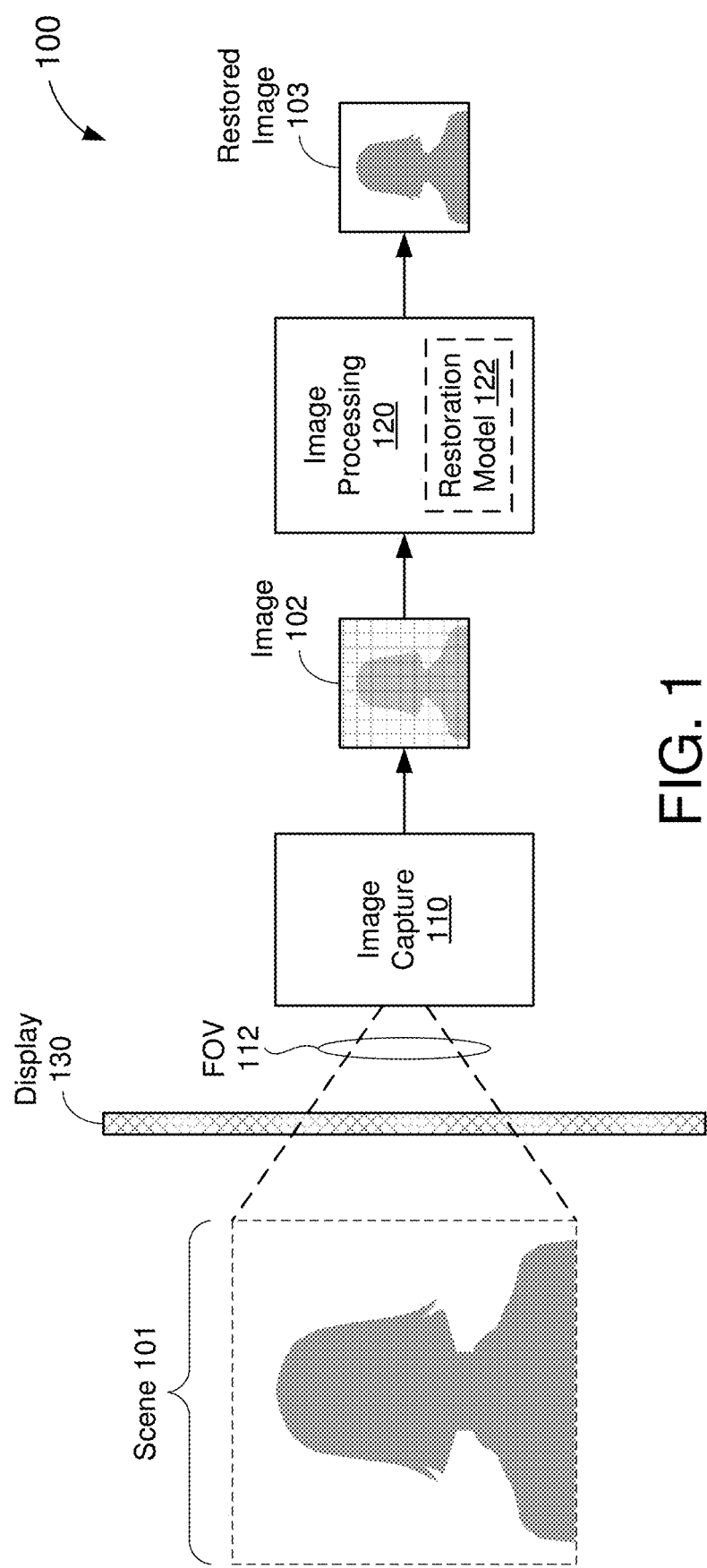
FIG. 1 shows a block diagram of an example image capture system, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, advancements in image capture and display technologies have created opportunities to expand the usable portion of the electronic display, without eliminating the front-facing camera, through greater integration of the camera and the display. For example, many modern electronic devices have porous displays which contain holes or gaps between display pixels (or sub-pixels). Example porous display technologies include organic light-emitting diode (OLED) and micro light-emitting diode (micro-LED) display technologies, among other examples. The holes or gaps in a porous display allow light from the environment (also referred to as "scene light") to filter through the display. To increase the usable display area, the front-facing camera can be hidden behind (or under) a porous display and configured to detect the scene light that filters through the display. Such front-facing cameras may be referred to herein as "under-display cameras." Aspects of the present disclosure recognize that the display pixels of the electronic display may block or occlude some of the scene light, creating noise or distortions (such as a screen door effect) in the images captured by an under-display camera.

Image processing can improve the quality of images captured by an under-display camera. For example, an image processor may adjust the brightness, color, or saturation of individual pixel values to correct for distortions caused by the electronic display, such as by removing the screen door effect (a process referred to as "restoration"). Some image processing techniques rely on machine learning to determine the adjusted pixel values. Machine learning generally includes a training phase and an inferencing phase. During the training phase, a machine learning system may be provided with one or more clean or undistorted images (also referred to as "ground truth" images) and a large volume of input images that are distorted by the electronic display. The machine learning system analyzes the training data to learn a set of rules (also referred to as a machine learning "model") that can be used to map the input images to the ground truth images. During the inferencing phase, the machine learning system may use the model to infer restored images from new input images captured by the under-display camera.

As used herein, the term "restoration model" refers to any machine learning model that can be used to infer restored images from distorted input images. The quality of the inferences depends on the accuracy of the images used for training the restoration model. For example, to precisely remove the screen door effect from images captured behind an electronic display, the machine learning system must receive input images and ground truth images that are nearly identical but for the distortions caused by the electronic display. In other words, the training data (including the input images and the ground truth images) should depict the same (static) scene in a stationary field-of-view (FOV), except that the input images are captured behind an electronic display whereas the ground truth images are captured with the FOV unobstructed by an electronic display. The training data is often acquired manually, by a human operator. Aspects of the present disclosure recognize that manually capturing such training data can be a tedious process, difficult to scale, and result in shifts or inconsistencies between the input images and the ground truth images.

Various aspects relate generally to machine learning, and more particularly, to automatons that can acquire input images and ground truth images for training restoration models. In some aspects, a system for acquiring training data may include a camera, an electronic display, and an apparatus configured to maintain the camera in a stationary position while moving the electronic display in and out of the camera's FOV. For example, the apparatus may be an automaton (such as a robot or a robotic arm) that is mechanically coupled to the camera and the electronic display. In some aspects, the system may further include a controller configured to acquire training data via the camera based on the positioning of the electronic display. The training data may be used to train a neural network model for inferring restored images from input images captured by an under-display camera. In some implementations, the controller may acquire ground truth images of a scene while the electronic display is covering the camera's FOV. In some other implementations, the controller may acquire input images of the scene while the electronic display is outside the camera's FOV.

Particular implementations of the subject matter described in this disclosure can be implemented to realize one or more of the following potential advantages. By automating the process of capturing ground truth images and input images, aspects of the present disclosure can produce more accurate restoration models than would otherwise be possible using manually captured images. As described above, even minor shifts or changes in camera position between the acquisition of a ground truth image and the acquisition of an input image may result in inaccuracies in the training of a restoration model. Aspects of the present disclosure recognize that automatons can hold a camera much more stationary over longer periods of time than human operators. Moreover, an automaton can move an electronic display in and out of a camera's FOV without disrupting the positioning of the camera. As such, aspects of the present disclosure can reduce or minimize shifts or inconsistencies between ground truth images and input images, thereby isolating differences between such images to distortions caused by the electronic display.

FIG. 1 shows a block diagram of an example image capture system 100, according to some implementations. The image capture system 100 includes an image capture component 110, an image processing component 120, and an electronic display 130. In some aspects, the image capture system 100 may be integrated within an electronic device such that the display 130 forms at least part of a surface or housing of the electronic device. Example suitable electronic devices include smartphones, tablets, televisions, and laptop computers, among other examples.

The image capture component 110 may be any sensor or device (such as a camera) configured to capture a pattern of light (also referred to as "scene light") in its field-of-view (FOV) 112 and convert the pattern of light to a digital image 102. For example, the digital image 102 may include an array of pixels (or pixel values) depicting a scene 101 in the FOV 112 of the image capture component 110. In some implementations, the image capture component 110 may be an under-display camera. In other words, the image capture device may be disposed behind (or under) the electronic display 130. As such, the image capture component 110 is hidden from view to provide an improved user experience. For example, such placement of the image capture component 110 may eliminate unsightly black borders, cutouts, or notches in the bezel of the electronic display 130, thereby increasing the usable display area or screen-to-body-ratio of the electronic device.

As shown in FIG. 1, the electronic display 130 encompasses or covers the FOV 112 of the image capture component 110. As a result, the FOV 112 may be partially obstructed by display pixels (or sub-pixels) of the electronic display 130. In this configuration, any scene light incident upon the image capture component 110 depends, at least in part, on the transmissivity and dispersion of the electronic display 130. Aspects of the present disclosure recognize that some display technologies (also referred to as "porous displays") provide partially transmissive "gaps" or empty spaces between display pixels or sub-pixels which allow at least some light to filter through. Example porous displays include organic light-emitting diode (OLED) displays and micro light-emitting diode (micro-LED) displays, among other examples. In some aspects, the electronic display 130 may be a porous display. In such aspects, the image 102 may exhibit distortions (such as a screen door effect) due to the scene light being partially occluded by the electronic display 130.

The image processing component 120 is configured to remove or correct distortions in the image 102 caused by the electronic display 130 (a process referred to as "restoration"). As a result, the image processing component 120 may produce a restored image 103 that more accurately depicts the original scene 101 without any interference from the electronic display 130. For example, the image processing component 120 may adjust the brightness, color, or saturation of individual pixel values to remove the screen door effect. In some implementations, the image processing component 120 may perform the restoring operation based on a restoration model 122 that is trained through machine learning. In other words, the image processing component 120 may use the restoration model 122 to "infer" the restored image 103 from the captured image 102. The quality of the inference may depend on the accuracy of the training data used to train the restoration model 122.

Figure 2:
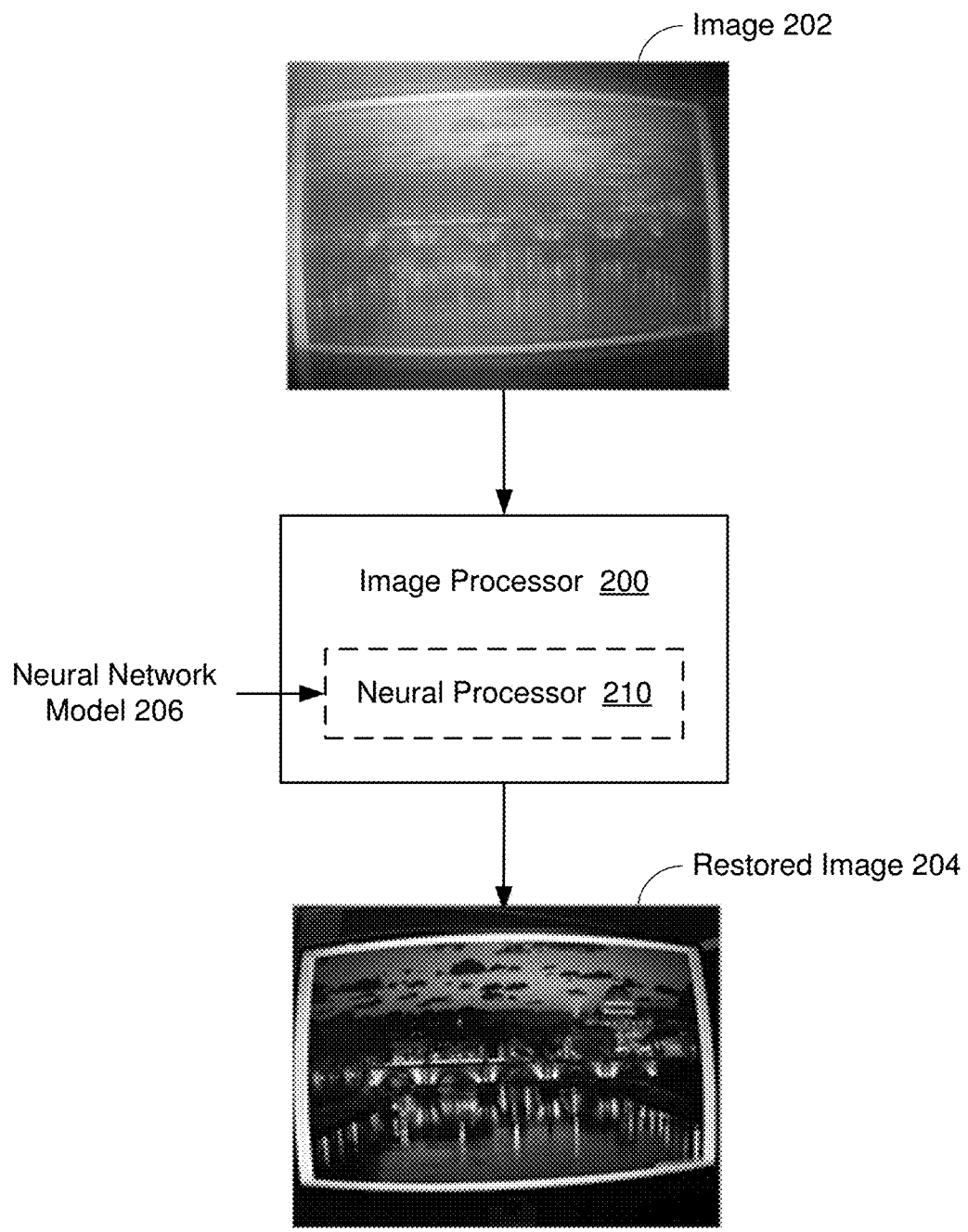
FIG. 2 shows a block diagram of an example image processor, according to some implementations.

FIG. 2 shows a block diagram of an example image processor 200, according to some implementations. In some aspects, the image processor 200 may be configured to restore images captured by an under-display camera. More specifically, the image processor 200 may receive a distorted input image 202 and produce a restored image 204 that more accurately reflects a scene depicted by the input image 202. In some implementations, the image processor 200 may be one example of the image processing component 120 of FIG. 1. With reference for example to FIG. 1, the input image 202 may be one example of the image 102 and the restored image 204 may be one example of the restored image 103.

In some implementations, the image processor 200 may produce the restored image 204 by performing a restoring operation on the input image 202 that reduces the amount of distortion associated therewith. In the example of FIG. 2, the image 202 depicts a scene in the FOV of an under-display camera (such as the image capture component 110 of FIG. 1). As a result, the scene depicted in the image 202 appears distorted or grainy. For example, the image 202 appears to be overlaid by a grid pattern, as though captured behind one or more layers of screen doors. This screen door effect is caused by display pixels (or sub-pixels) of an electronic display distorting or obfuscating some of the scene light in the camera's FOV. In contrast, the color and brightness of pixels in the restored image 204 follow a substantially smooth distribution. For example, dark regions of the scene appear uniformly dark and bright regions of the scene appear uniformly bright in the restored image 204. In other words, the restored image 204 appears as though it was captured by a camera having an unobstructed view of the scene.

In some implementations, the image processor 200 may include a neural processor 210. The neural processor 210 is configured to implement a neural network based on a neural network model 206. A neural network is a particular form of machine learning in which information is passed through multiple layers of an interconnected framework of artificial neurons. Each layer of artificial neurons performs a different transformation on the input data to produce a desired inference (such as a restored image) at the output of the neural network. The transformations performed by each layer of artificial neurons is collectively referred to as a "neural network model." In the example of FIG. 2, the neural network model 206 may describe a set of transformations that can be performed on the input image 202 to produce the restored image 204. In some implementations, the neural network model 206 may be one example of the restoration model 122 of FIG. 1. As such, the neural processor 210 may infer the restored image 204 from the input image 202 based on the neural network model 206.

The neural network model 206 may be trained using distorted input images and undistorted (or low-distortion) ground truth images. During the training operation, a neural network attempts to recreate the ground truth images from the input images. The neural network model 206 includes a set of weights to be applied to each transformation performed by the neural network that results in the recreation of the ground truth images. Thus, the quality of the inferences depends on the accuracy of the ground truth images and input images used to train the neural network model 206. Even minor changes in camera position between the capture of a ground truth image and the capture of an input image may result in inaccuracies in the neural network model 206. In some aspects, the ground truth images and input images may be acquired via an automaton that is configured to hold a camera in a stationary position while moving an electronic display in and out of the camera's FOV to acquire the ground truth images and the input images.

Figure 3:
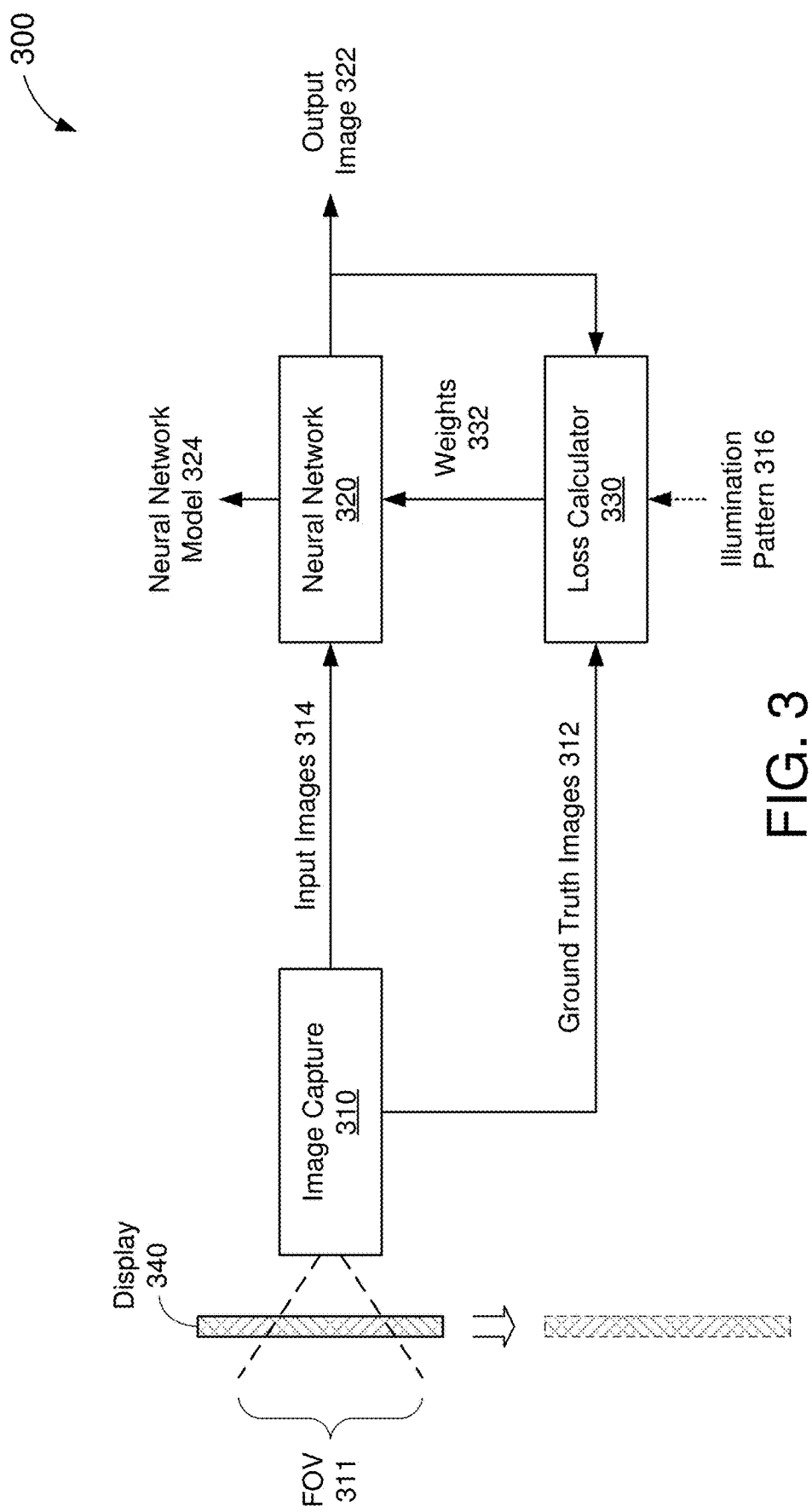
FIG. 3 shows a block diagram of an example machine learning system, according to some implementations.

FIG. 3 shows a block diagram of an example machine learning system 300, according to some implementations. In some aspects, the machine learning system 300 may be configured to produce a neural network model 324 that can be used to infer restored images from distorted input images. For example, the distorted input images may be captured by an under-display camera. In some implementations, the neural network model 324 may be one example of the restoration model 122 of FIG. 1 or the neural network model 206 of FIG. 2.

The machine learning system 300 includes an image capture component 310, a neural network 320, a loss calculator 330, and an electronic display 340. In some implementations, the electronic display 340 may be a porous display that allows at least some scene light to filter through (such as the electronic display 130 of FIG. 1). In some aspects, the electronic display 340 may be dynamically positioned (and repositioned) relative to the image capture component 310 to acquire training data that can be used to train the neural network model 324. For example, the electronic display 340 may be coupled to or otherwise supported by an automaton (not shown for simplicity) configured to move the electronic display 340 in and out of the FOV 311 of the image capture component 310 according to a predetermined pattern or configuration. In some configurations, the automaton may position the electronic display 340 in front of the image capture component 310 so that the display 340 covers the FOV 311. In some other configurations, the automaton may position the electronic display 340 away from the image capture component 310 so that the display 340 is outside the FOV 311.

The image capture component 310 is configured to capture ground truth images 312 and input images 314 of a scene in its FOV 311. In some aspects, the ground truth images 312 and the input images 314 may depict the same (static) scene with varying amounts of distortion. For example, the automaton may hold the image capture component 310 in the same position over a duration in which one or more ground truth images 312 and one or more input images 314 are captured. In some implementations, the image capture component 310 may capture the input images 314 while the electronic display 340 is covering its FOV 311. As such, the input images 314 may depict the scene with distortions from the electronic display 340 (similar to the input image 202 of FIG. 2). In some other implementations, the image capture component 310 may capture the ground truth images 312 while the electronic display 340 is outside its FOV 311. As such, the ground truth images 312 may be representative images of the scene without any distortions from the electronic display 340 (similar to the restored image 204 of FIG. 2).

The neural network 320 attempts to recreate each ground truth image 312 by applying a series of transformations to the input images 314. For example, the neural network 320 may form a network of connections across multiple layers of artificial neurons that begin with an input image 314 and result in an output image 322. The connections are weighted to produce an output image 322 that closely resembles a ground truth image 312. For example, the training operation may be performed over multiple iterations. In each iteration, the neural network 320 produces an output image 322 based on the weighted connections between the artificial neurons and the loss calculator 330 updates the weights 332 associated with the connections based on an amount of loss (or error) between the output image 322 and the ground truth image 312. The neural network 320 may output the weighted connections as the neural network model 324 when certain convergence criteria are met (such as when the loss falls below a threshold level or after a predetermined number of iterations).

Aspects of the present disclosure recognize that light emitted by the electronic display 340 can interfere with the scene light detected by the image capture component 310. In some implementations, at least a portion of the electronic display 340 may be dimmed or turned off when the image capture component 310 captures the ground truth images 312. For example, the portion of the electronic display 340 that is dimmed or turned off may include any display pixels in the FOV 311 of the image capture component 310. In such implementations, the same or similar portion of an electronic display (such as the electronic display 340 or another electronic display covering the FOV of an under-display camera used for inferencing) may be dimmed or turned off when capturing new input images during an inferencing phase.

In some other implementations, the neural network model 324 may be trained using input images 314 captured under varying patterns of light emitted by the electronic display 340. For example, the electronic display 340 may be configured to display a predetermined pattern of light when the image capture component 310 captures a first input image 314 and may be configured to display a different pattern of light when the image capture component 310 captures a second input image 314. In some implementations, the pattern of light emitted by the electronic display (also referred to as an illumination pattern 316) may be provided as an additional input to the machine learning system 300. For example, the loss calculator 330 may further update the weights 332 based, at least in part, on differences between the output image 322 and the illumination pattern 316.

Figure 4A:
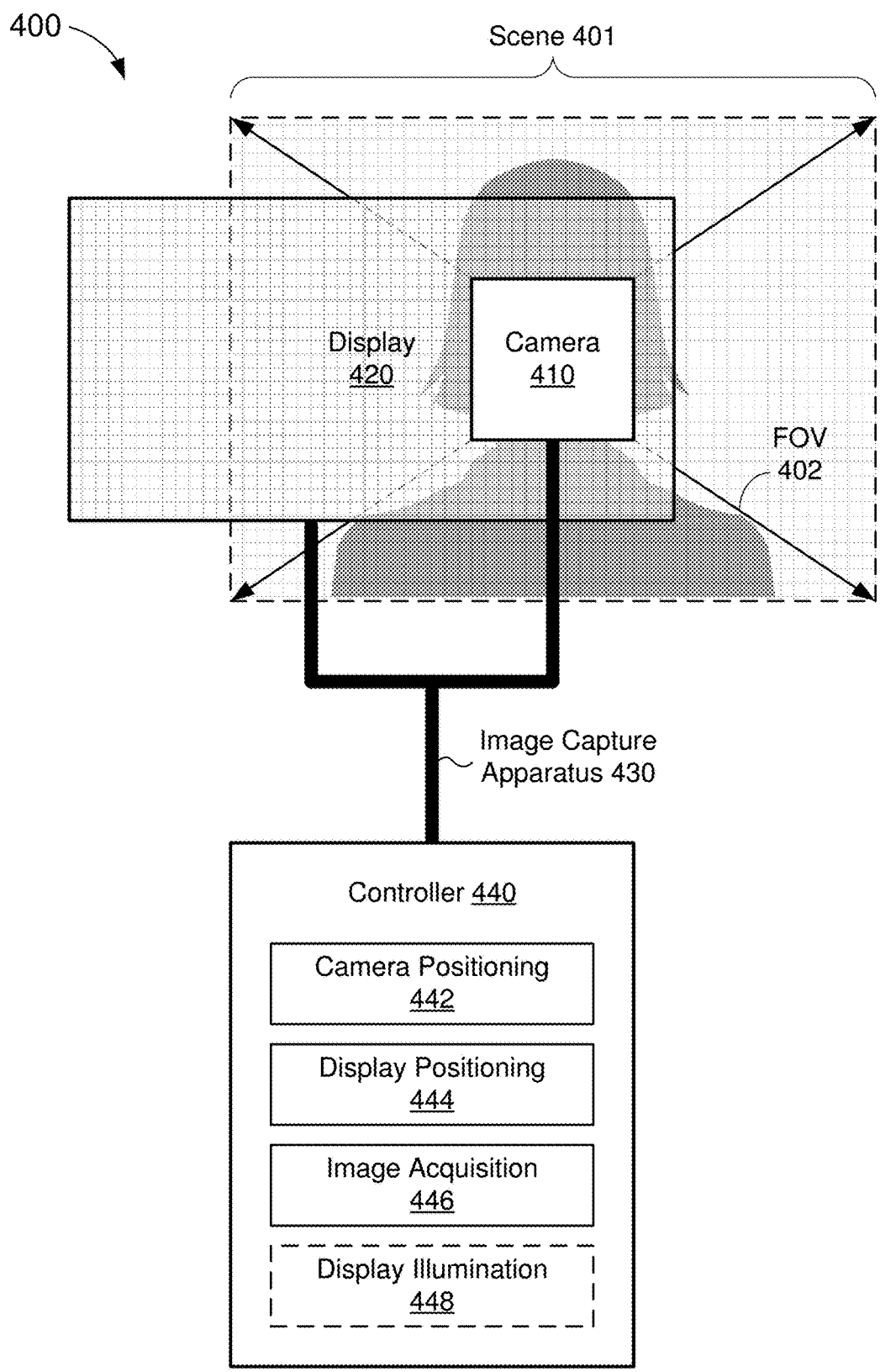
FIGS. 4A and 4B show an example system for acquiring training data that can be used to train a neural network model.
Figure 4B:
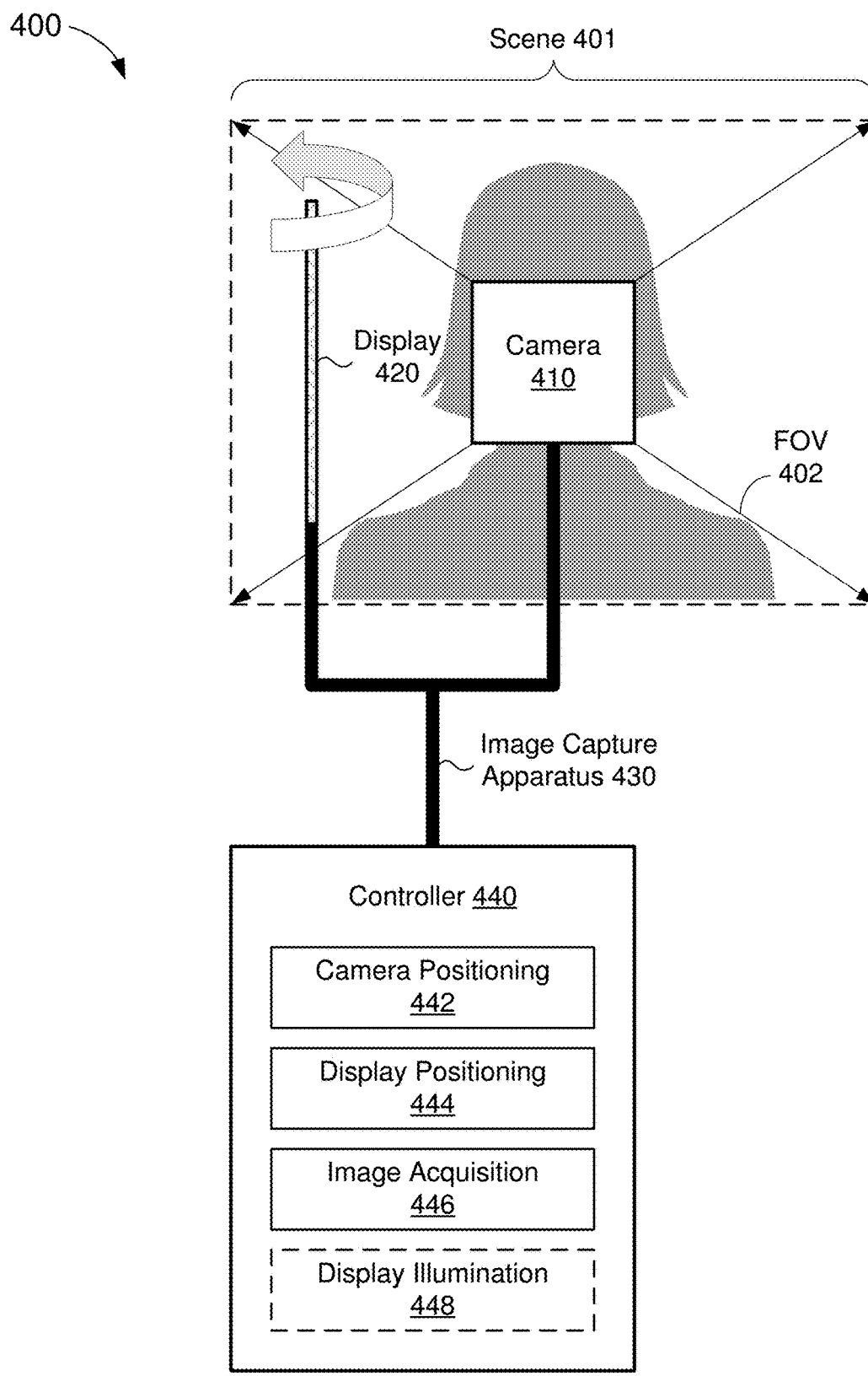

FIGS. 4A and 4B show an example system 400 for acquiring training data that can be used to train a neural network model. More specifically, the system 400 may be configured to acquire ground truth images and input images that can be used to train a restoration model. In some aspects, the restoration model may be used to infer restored images from distorted input images captured by an under-display camera. In some implementations, the system 400 may be one example of the machine learning system 300 of FIG. 3.

The system 400 includes a camera 410, an electronic display 420, an image capture apparatus 430, and a controller 440. The image capture apparatus 430 is coupled to the camera 410, the electronic display 420, and the controller 440. More specifically, the camera 410 and the electronic display 420 may be affixed to, or held by, the image capture apparatus 430 such that movements of the apparatus 430 may change a positioning of the camera 410 or the electronic display 420. For example, the image capture apparatus 430 may be an automaton (such as a robotic arm) having 6 (or fewer) degrees of freedom. In some implementations, the apparatus 430 may be configured to move (or position) the electronic display 420. In some other implementations, the apparatus 430 may be configured to move (or position) the camera 410.

The controller 440 is configured to control the movements of the image capture apparatus 430. In some implementations, the controller may include a camera positioning component 442, a display positioning component 444, and an image acquisition component 446. The camera positioning component 442 controls a positioning of the camera 410 by the image capture apparatus 430. More specifically, the camera positioning component 442 may cause the image capture apparatus 430 to point the camera 410 at a scene 401. As shown in FIGS. 4A and 4B, the scene 401 represents an FOV 402 of the camera 410 at the camera's current position. In some implementations, the camera positioning component 442 may cause the image capture apparatus 430 to move or reposition the camera 410 so that the FOV 402 encompasses a different scene (or a different view of the scene 401).

The display positioning component 444 controls a positioning of the electronic display 420 by the image capture apparatus 430. More specifically, the display positioning component 444 may cause the image capture apparatus 430 to move the electronic display 420 in and out of the FOV 402 of the camera 410. In some implementations, the display positioning component 444 may cause the image capture apparatus 430 to move or position the electronic display 420 in front of the camera 410 so that the electronic display 420 covers the FOV 402 of the camera 410 (such as shown in FIG. 4A). In some other implementations, the display positioning component 444 may cause the image capture apparatus 430 to move or position the electronic display 420 away from the camera 410 so that the electronic display 420 is outside the FOV 402 of the camera 410 (such as shown in FIG. 4B).

In the example of FIGS. 4A and 4B, the image capture apparatus 430 is shown to rotate the electronic display 420 towards the camera 410 and away from the camera 410. More specifically, the electronic display 420 is shown to be rotated by 90° between the configuration of FIG. 4A and the configuration of FIG. 4B. However, in actual implementations, the image capture apparatus 430 may move the electronic display 420 in various other directions (or combinations of directions) so that the electronic display 420 covers the FOV 402 in a first configuration and is outside the FOV 402 in a second configuration. In some implementations, the apparatus 430 may rotate the electronic display 420 by a different degree (greater than or less than 90°). In some other implementations, the apparatus 430 may shift the electronic display 420 in a horizontal direction. Still further, in some implementations, the apparatus 430 may shift the electronic display in a vertical direction.

The image acquisition component 446 controls an operation of the camera 410. More specifically, the image acquisition component 446 may cause the camera 410 to capture images of the scene 401 in its FOV 402. In some implementations, the image acquisition component 446 may cause the camera 410 to capture one or more input images responsive to moving the electronic display 420 in front of the camera 410 (such as shown in FIG. 4A). As a result, the input images may depict the scene 401 with distortions from the electronic display 420 (which is covering the FOV 402). In some other implementations, the image acquisition component 446 may cause the camera 410 to capture one or more ground truth images responsive to moving the electronic display 420 away from the camera 410 (such as shown in FIG. 4B). As a result, the ground truth images may depict the scene 401 without distortions from the electronic display 420 (which is outside the FOV 402).

In some implementations, the controller 440 may further include a display illumination component 448 to control an illumination of the electronic display 420. More specifically, the display illumination component 448 may adjust the color, brightness, or saturation of one or more display pixels to control the distortion or interference caused by the electronic display 420 when the camera 410 captures the input images (such as described with reference to FIG. 3). In some implementations, the display illumination component 448 may cause the electronic display 420 to dim or turn off a subset of the display pixels while the display 420 is covering the FOV 402 of the camera 410. For example, the subset of display pixels may include at least the display pixels overlapping or coinciding with the FOV 402. In some other implementations, the display illumination component 448 may cause the electronic display 420 to display varying patterns of light while the display 420 is covering the FOV 402 of the camera 410. For example, the electronic display 420 may display a different pattern of light for each input image acquired via the camera 410.

Aspects of the present disclosure recognize that different electronic displays may impart different patterns of distortion or artifacts on the images captured by an under-display camera. For example, the variations in distortion may be attributed to process variations or differences in display technologies associated with different electronic displays. Thus, to train a robust restoration model that can be used to restore distorted images captured behind any electronic display, the system 400 may be configured to acquire pairs of ground truth images and input images captured behind multiple different electronic displays. In some aspects, the image capture apparatus 430 may be detachably coupled to the display 420 so that different displays can be easily substituted (or interchanged) during the data acquisition process.

Figure 5:
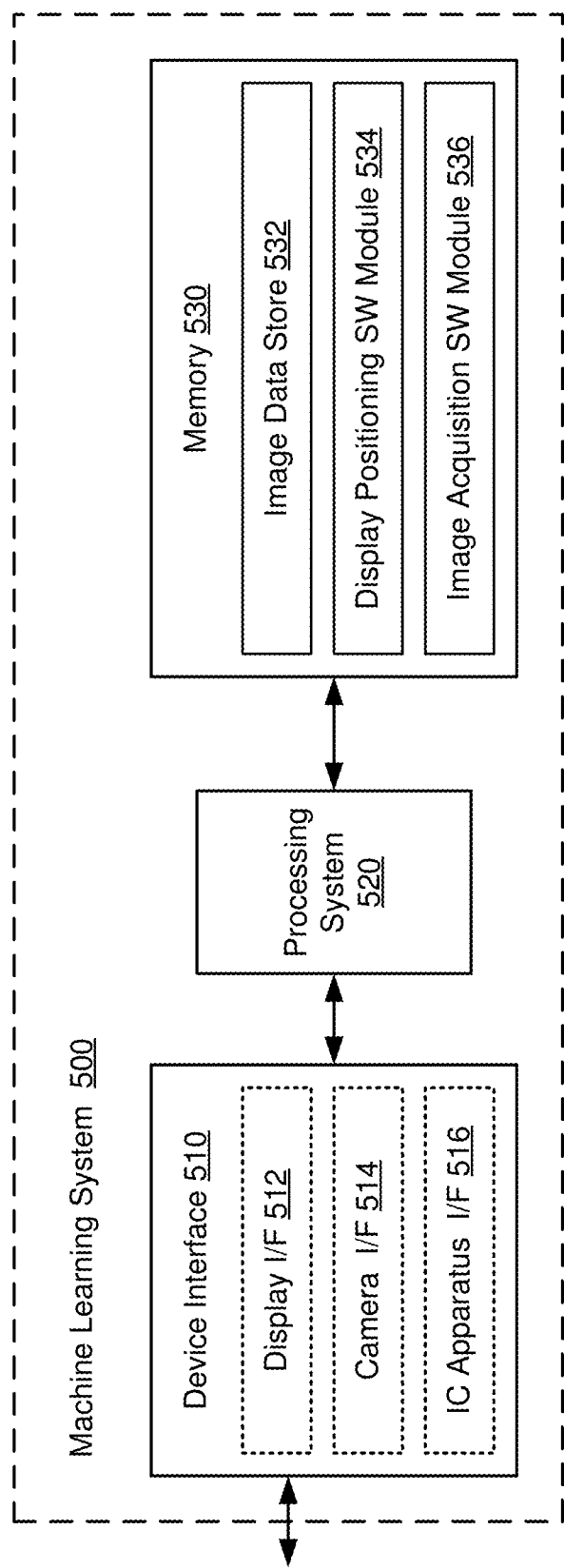
FIG. 5 shows another block diagram of an example machine learning system, according to some implementations.

FIG. 5 shows a block diagram of an example data acquisition system 500, according to some implementations. More specifically, the data acquisition system 500 may be configured to acquire ground truth images and input images that can be used to train a restoration model. In some aspects, the restoration model may be used to infer restored images from distorted images captured by an under-display camera. In some implementations, the data acquisition system 500 may be one example of the controller 440 of FIG. 4.

The data acquisition system 500 includes a device interface 510, a processing system 520, and a memory 530. The device interface 510 is configured to communicate with various other components that may be used to acquire the ground truth images and input images. In some implementations, the device interface 510 may include a display interface (I/F) 512 to facilitate communications with an electronic display (such as the electronic display 420 of FIG. 4). In some implementations, the device interface 510 may further include a camera I/F 514 to facilitate communications with an image capture component (such as the camera 410 of FIG. 4). Still further, in some implementations, the device interface 510 may include an image capture (IC) apparatus I/F 516 to facilitate communications with an image capture apparatus (such as the image capture apparatus 430 of FIG. 4).

The memory 530 may include an image data store 532 to store one or more images acquired via the image capture component. The memory 530 also may include a non-transitory computer-readable medium (including one or more nonvolatile memory elements, such as EPROM, EEPROM, Flash memory, or a hard drive, among other examples) that may store at least the following software (SW) modules:

- a display positioning SW module 534 to move the electronic display between a first position and a second position relative to the camera so that the electronic display covers an FOV of the camera in the first position and is outside the FOV of the camera in the second position; and
- an image acquisition SW module 536 to acquire a plurality of images of a scene via the camera based on the positioning of the electronic display relative to the camera.

Each software module includes instructions that, when executed by the processing system 520, causes the data acquisition system 500 to perform the corresponding functions.

The processing system 520 may include any suitable one or more processors capable of executing scripts or instructions of one or more software programs stored in the data acquisition system 500 (such as in the memory 530). For example, the processing system 520 may execute the display positioning SW module 534 to move the electronic display between a first position and a second position relative to the camera so that the electronic display covers an FOV of the camera in the first position and is outside the FOV of the camera in the second position. The processing system 520 also may execute the image acquisition SW module 536 to acquire a plurality of images of a scene via the camera based on the positioning of the electronic display relative to the camera.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A system comprising:
   a camera;
   an electronic display;
   an apparatus configured to move the electronic display between a first position and a second position relative to the camera so that the electronic display covers a field-of-view (FOV) of the camera in the first position and is outside the FOV of the camera in the second position; and
   a controller configured to acquire a plurality of images of a scene via the camera based on the positioning of the electronic display relative to the camera.

2. The system of claim 1, wherein the controller is configured to:
   acquire a first image of the plurality of images responsive to the apparatus moving the electronic display to the first position; and
   acquire a second image of the plurality of images responsive to the apparatus moving the electronic display to the second position.

3. The system of claim 2, wherein the system further comprises a machine learning system configured to train a neural network model based at least in part on the first image and the second image.

4. The system of claim 3, wherein the neural network model is trained to generate a recreation of the second image based at least in part on the first image.

5. The system of claim 3, wherein the neural network model is further trained based on a pattern of light displayed by the electronic display during the acquisition of the first image.

6. The system of claim 2, wherein the apparatus is further configured to maintain the camera in the same position from the acquisition of the first image to the acquisition of the second image.

7. The system of claim 2, wherein at least a portion of the electronic display is not illuminated during the acquisition of the first image.

8. The system of claim 7, wherein the portion of the electronic display that is not illuminated coincides with the FOV of the camera.

9. The system of claim 2, wherein the controller is further configured to:
- display a first pattern of light via the electronic display during the acquisition of the first image;
- acquire a third image of the plurality of images responsive to the apparatus moving the electronic display to the first position; and
- display a second pattern of light via the electronic display during the acquisition of the third image, the second pattern of light being different than the first pattern of light.

10. The system of claim 1, wherein the apparatus is further configured to reposition the camera after the controller acquires the plurality of images so that the FOV of the camera encompasses a different scene.

11. A data acquisition system comprising:
- a processing system; and
- a memory storing instructions that, when executed by the processing system, causes the data acquisition system to:
  - move an electronic display between a first position and a second position relative to a camera so that the electronic display covers a field-of-view (FOV) of the camera in the first position and is outside the FOV of the camera in the second position; and
  - acquire a plurality of images of a scene via the camera based on the positioning of the electronic display relative to the camera.

12. The data acquisition system of claim 11, wherein execution of the instructions for acquiring the plurality of images further causes the data acquisition system to:
- acquire a first image of the plurality of images responsive to the data acquisition system moving the electronic display to the first position; and
- acquire a second image of the plurality of images responsive to the data acquisition system moving the electronic display to the second position.

13. The data acquisition system of claim 12, wherein execution of the instructions further causes the data acquisition system to:
train a neural network model based at least in part on the first image and the second image.

14. The data acquisition system of claim 13, wherein the neural network model is trained to generate a recreation of the second image based at least in part on the first image.

15. The data acquisition system of claim 13, wherein the neural network model is further trained based on a pattern of light displayed by the electronic display during the acquisition of the first image.

16. The data acquisition system of claim 12, wherein execution of the instructions further causes the data acquisition system to:
maintain the camera in the same position from the acquisition of the first image to the acquisition of the second image.

17. The data acquisition system of claim 12, wherein at least a portion of the electronic display is not illuminated during the acquisition of the first image.

18. The data acquisition system of claim 17, wherein the portion of the electronic display that is not illuminated coincides with the FOV of the camera.

19. The data acquisition system of claim 12, wherein execution of the instructions further causes the data acquisition system to:
- display a first pattern of light via the electronic display during the acquisition of the first image;
- acquire a third image of the plurality of images responsive to the data acquisition system moving the electronic display to the first position; and
- display a second pattern of light via the electronic display during the acquisition of the third image, the second pattern of light being different than the first pattern of light.

20. The data acquisition system of claim 11, wherein execution of the instructions further causes the data acquisition system to:
reposition the camera after the data acquisition system acquires the plurality of images so that the FOV of the camera encompasses a different scene.

* * * * *